April 21, 1964     S. LOMBARDO     3,129,615
MULTIPLE-TOOL BORING MACHINE HEAD
Filed Oct. 16, 1961     2 Sheets-Sheet 1
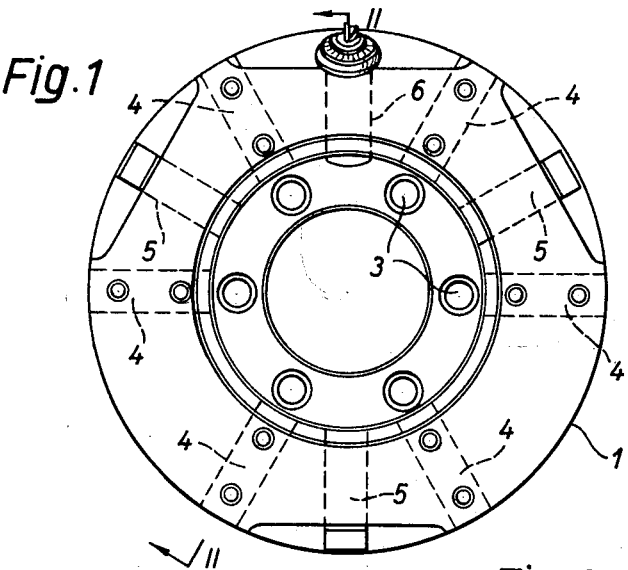
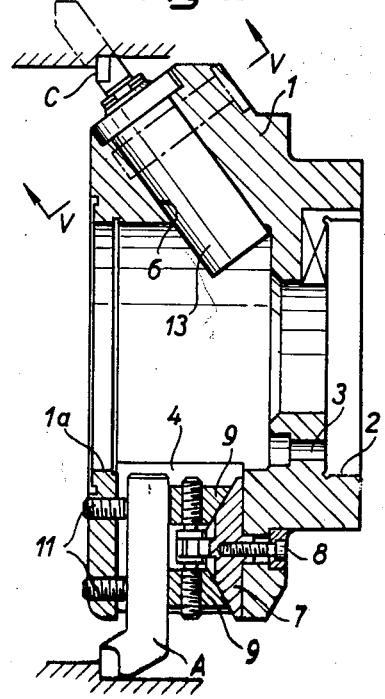
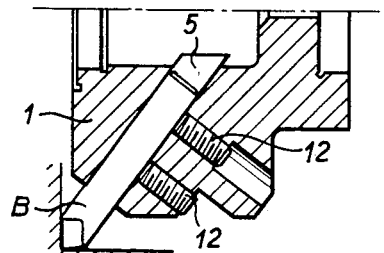
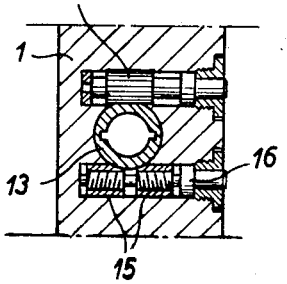

April 21, 1964     S. LOMBARDO     3,129,615
MULTIPLE-TOOL BORING MACHINE HEAD
Filed Oct. 16, 1961
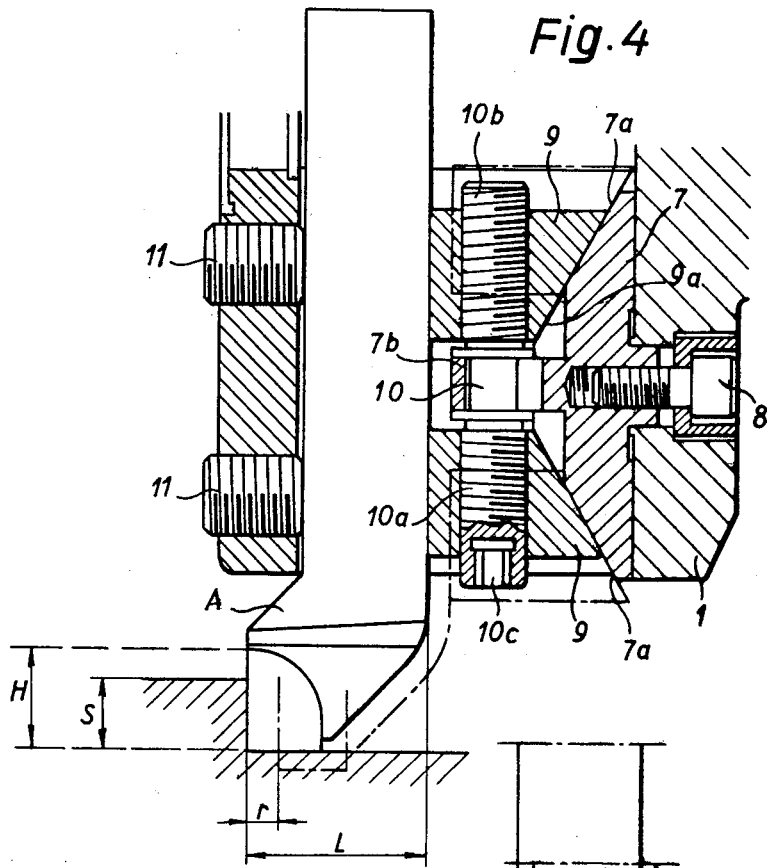
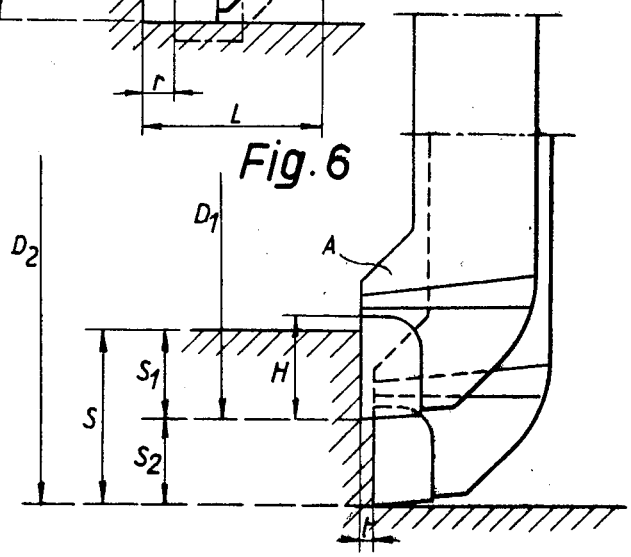

United States Patent Office 3,129,615
Patented Apr. 21, 1964

3,129,615
MULTIPLE-TOOL BORING MACHINE HEAD
Salvatore Lombardo, Milan, Italy, assignor to Innocenti Soc. Gen. per l'Industria Metallurgica e Meccanica, Milan, Italy
Filed Oct. 16, 1961, Ser. No. 145,122
Claims priority, application Italy Oct. 24, 1960
2 Claims. (Cl. 77—58)

The present invention relates to a multiple-tool boring machine head that can be applied to ordinary boring machines of all kinds which have sufficient power.

Another purpose of the invention is to produce a boring machine head on to which various tool models can be fixed enabling various kinds of work to be carried out, such as open borings, blind borings or finishing borings, in order to increase the machine's production.

Another purpose of the invention is to produce a boring machine head on which the boring diameter can be rapidly and accurately varied.

Another purpose of the invention is to produce a machine head enabling all the power of the machine to be used by operating a greater number of tools at the same time so as to reduce the number of passes required and hence the total working time.

Other purposes and advantages of the invention will be revealed by the description given hereafter and the attached drawings, in which:

FIGURE 1 is a front view of the head;
FIGURE 2 is a cross section taken along the line II—II of FIGURE 1;
FIGURE 3 is a section taken along the line III—III of FIGURE 1;
FIGURE 4 is a detail view on a larger scale of part of FIGURE 2;
FIGURE 5 is a partial section taken along the line V—V of FIGURE 2;
FIGURE 6 is a diagram showing a special arrangement of the tools for carrying out open borings at each end.

The reference numeral 1 denotes the body of the essentially cylindrically shaped head. This body comprises a rear cylindrical seat 2 for centering and a series of holes 3 for fixing on the mandrel of the boring machine.

The head is provided with a plurality of peripheral seats or housings able to contain various models of tools for carrying out various kinds of work.

According to the example shown in the drawings, there are hollowed out in the head: six prismatic seats 4 in a radial direction, in each of which a tool A may be placed for carrying out open borings, three seats indicated by 5, also of prismatic shape, contained on radial planes and directed according to sloping axes, are each intended to accommodate a tool B for carrying out borings, blind roughings-down and a cylindrical seat 6 whose axis is contained in a radial plane and sloped with regard to the axis of the mandrel, this seat containing a tool C with micrometric adjustment for carrying out finish borings.

The tools contained in the seats 4 can be regulated for position by displacement either in a direction parallel to the axis of the mandrel, or in a radial direction for modifying the diameter of the bore. With reference to FIGURE 4, for longitudinal adjustment, on the lower part of the seats 4, there is a wedge 7 fixed by a screw 8 and provided with two opposed inclined planes 7a with which the corresponding inclined planes 9a cooperate effected by a pair of movable wedges 9. The position of the movable wedges 9 can be regulated by means of a transverse screw 10 whose smooth central section engages in the cavity of a projection 7b of the fixed wedge 7 and whose end sections 10a and 10b are threaded in opposite directions.

The screw 10 comprises a frontal socket 10c enabling rotation to be controlled, which consequently determines the approach or withdrawal of the movable wedges 9, which, in sliding in contact with the inclined planes 7a of the fixed wedge, modify the position of the rear bearing plane of the tool A, which enables its adjustment to be made indicated by the reference "r."

The locking of the tools A under the seats 4 is made by means of frontal screws 11 after having adjusted the position of the movable wedges 9.

The tools B can be locked (see FIGURE 3) in the seats 5 by means of set-screws 12, these tools capable of being easily and speedily regulated for position after loosening the screws, by sliding them along the prismatic seats 5 which have a section corresponding to that of the tool with a slight clearance.

The finishing tool C, with micrometric adjustment (see FIGURES 1, 2, and 5) are contained in a cylindrical casing 13 provided with external rack teeth and meshing with a pinion 14 inserted in a transverse seat of the head and forming the controlling component for rapidly adjusting the position of the tool. After having made the adjustment for position, the casing 13 is locked by means of two cylindrical transverse wedges 15 actuated by a single screw 16 acting on each of the wedges and having sections threaded in an opposite direction.

FIGURES 7 and 8 show two different models of gauges acting to rapidly determine and check the positions of the tools in order to place them in the accurate working position.

By arranging the tools A on the same frontal plane and on the same diameter, the cutting-edges of the various tools work at the same time. In this case, the depth of passage S is less than the height H of the cutting-edge of the tool (see FIGURE 4) and the advance per revolution and per minute is "$n$" times the advance that can be obtained with ordinary single-tool boring heads.

In this case, the time for making a pass is:

$$Tn = \frac{Ts}{n}$$

where $Tn$ = the time for making a pass with $n$ tools
$Ts$ = the time for making a pass with a single tool
$n$ = the number of tools at work.

The power consumed for this work is "$n$" times the power consumed by a single tool. Consequently, the power available on the boring machine is used to the very greatest extent.

The presence of the key-shaped wedges 9 enable the tools to be quickly placed in said position independently of the quantity L, i.e., the distance of the cutting-edge of the tool in ratio to its rear bearing plane, a quantity subjected to variations owing to the successive grindings of the tool. The replacement of the cutting-edge, owing to breaking, also entails variations from one tool to another.

As will be apparent from the foregoing, taken in connection with the drawings, the abutments (wedges 9, screws 11, etc.) in the slots (e.g. slot 4) allow for independent adjustment of the tools in the various slots. Thus, the tools may be of different length and may have different thickness shanks. Because of the independent adjustment of the abutment in the slots, matched sets of tools are not necessary even though different dimension tools may be set for the same cutting radius.

Tools of the A type can also be arranged on different frontal planes and diameters. This arrangement is advocated in the case where the metal S to be removed (FIGURE 6) extends beyond the height H of the cutting-edge. We shall then have part of the tools available according to the diameter D1 so that the metal to be removed S1 by the latter does not go beyond the height H of the cutting-edge. The remaining part of the tools is arranged on a frontal plane withdrawn by a quantity L and according to a diameter D2 so as to remove the remainder S2 of the excess metal S.

If, for example, we have an assembly of six tools available, 3 are arranged according to the diameter D1 and 3 according to the diameter D2, the advance is thus triple in comparison to work with a single tool, and, moreover, two passes are made at the same time, the one made by the tools placed on the diameter D1 and the other by the tools placed on the diameter D2.

Hence, we have as working time:

$$Tn = \frac{Ts}{n}$$

where $n$ is the total number of tools.

Work with a single tool would have required an appreciably longer time, i.e.:

$$T = Ts + (T1 \text{ and } T2) = (n-1)$$

In this formula:

$T$ = the total time for carrying out the work with a single tool
$T1$ = for non-cutting return between one pass and the next
$T2$ = time for adjusting the tool between two successive diameters
$TS$ = time for making one pass with a single tool
$n$ = number of passes necessary.

The boring head described above thus enables appreciable savings to be effected in time and money, in work where it is required to remove a great deal of excess metal.

What I claim is:

1. Multiple-tool boring head comprising a plurality of radially extending and circumferentially spaced tool-shank receiving slots in the tool head body, each of said slots being elongated in axial direction of said body and being defined by two side walls and two end walls formed by portions of said body, at least two axially adjustable and axially spaced abutments in each of said slots, means for supporting each of said abutments in said end walls of each slot and externally operated means for adjustment of the axial position of each of said abutments in each slot relative to said body so that in each of said slots a tool shank can be clamped between said abutments in radially and axially different positions relative to the boring head and of other tool shanks in other slots.

2. Multiple-tool boring head as defined in claim 1, wherein one of said abutments comprises two radially spaced and axially extending screws in passing through relationship with one end wall of the slot, the other abutment comprising a key-shaped wedge fixed to the opposite end wall of the slot, a pair of radially movable wedges slidably engaging the key-shaped wedge and a radially disposed screw rotatably fixed to said key-shaped wedge and having two oppositely threaded portions engaging each of the movable wedges.

References Cited in the file of this patent
UNITED STATES PATENTS

| | | |
|---|---|---|
| 871,053 | Winningham | Nov. 12, 1907 |
| 1,046,296 | Himes | Dec. 3, 1912 |
| 1,172,781 | Forsyth et al. | Feb. 22, 1916 |
| 1,644,197 | Marty | Oct. 4, 1927 |
| 1,963,767 | Vanderlip | June 19, 1934 |
| 2,443,704 | Fersing | June 22, 1948 |
| 2,534,333 | Wyrick | Dec. 19, 1950 |
| 2,537,517 | De Vlieg | Jan. 9, 1951 |
| 3,024,674 | Judd | Mar. 13, 1962 |